J. F. Dubber.
Pocket Book.
No. 2,475. Reissued Feb. 12, 1867.
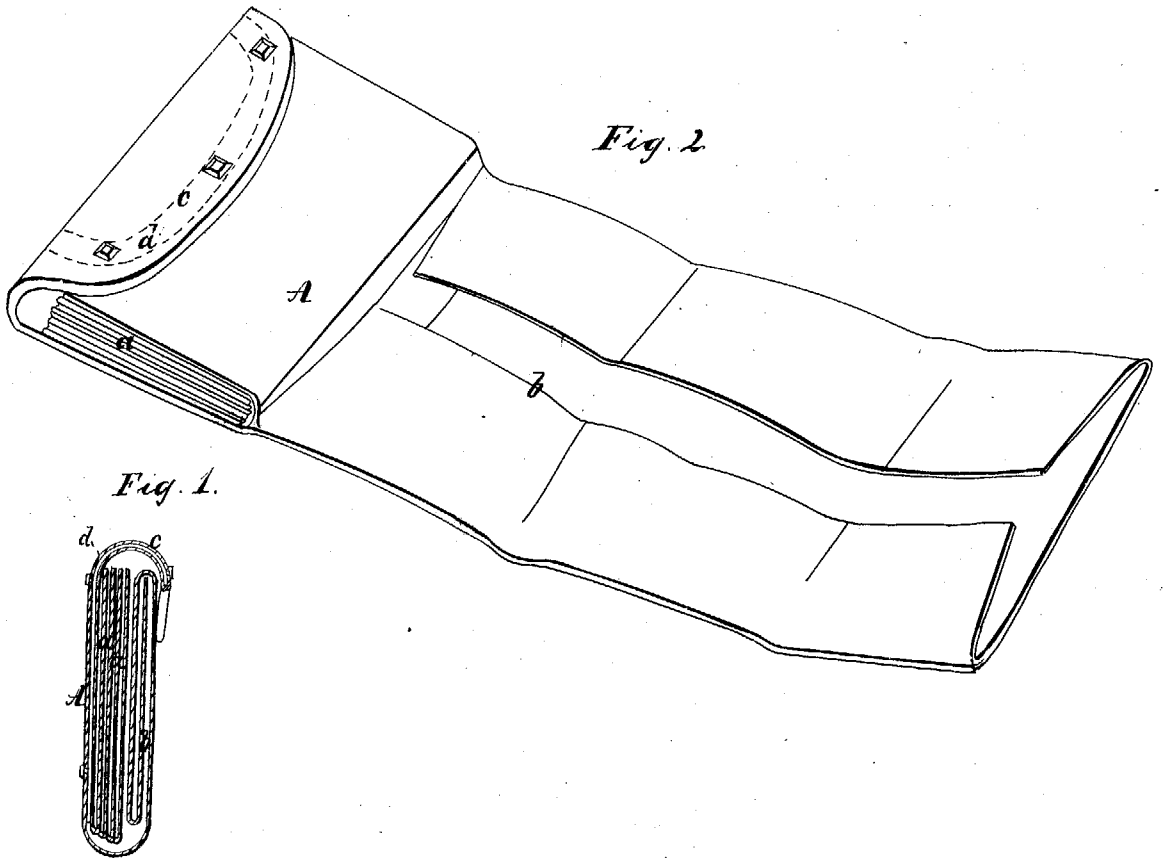
Witnesses
M. M. Livingston
James P. Hall
Inventor
J. Fred Dubber
N. PETERS, PHOTO-LITHOGRAPHER, WASHINGTON, D. C.

United States Patent Office.

J. FREDERICK DUBBER, OF BROOKLYN, NEW YORK.

*Letters Patent No.* 45,819, *dated January* 10, 1865; *reissue No.* 2,475, *dated February* 12, 1867.

POCKET-BOOK.

The Schedule referred to in these Letters Patent and making part of the same.

TO ALL WHOM IT MAY CONCERN:

Be it known that I, J. F. DUBBER, the city, county, and State of New York, have invented a new and improved Pocket-Book; and I do hereby declare that the following is a full, clear, and exact description thereof, which will enable those skilled in the art to make and use the same, reference being had to the accompanying drawing, forming part of this specification, in which—

Figure 1 represents a transverse section of a pocket-book when closed.

Figure 2 is a perspective view of the same when partially open.

Similar letters of reference in both views indicate corresponding parts.

This invention consists in the arrangement of one or more strips of elastic sheet metal, or other suitable elastic material, (spring steel being used by preference,) in combination with the closing flap of a pocket-book, or other similar article, said strip or strips being secured in the edge or edges of the flap in such a manner that by its or their action the pocket-book, or other article, is kept closed without the aid of the usual clasps, strings, or other fastenings; and if a portion of the pocket-book, or other article, is unfolded or opened, the remaining portion is still kept closed by the action of the elastic strip or strips, and the contents of said pocket-book, or other article, are preserved from dropping out accidentally.

A represents a pocket-book of any desirable construction and size, provided with a series of pockets, *a*, to receive and hold coin or small currency, and with a folding-pouch, *b*, to receive bills. A flap, *c*, which passes over the edge of the pocket-book, when the same is in the position shown in fig. 1 of the drawing, serves to keep the same closed. This flap is provided with one or more strips *d* of spring steel, or other suitable elastic material, one continuous strip being used by preference, which is embedded in the edge of said closing flap, and fastened thereto by rivets, or in any other suitable manner. By the action of this spring, the edge of the closing flap is strengthened, and the pocket-book is rendered durable without losing the desired pliability; and furthermore, the closing flap is enabled to keep the pocket-book closed without the aid of strings, clasps, or other fastenings. Said spring is so adjusted that when the bill-pouch is unfolded, as shown in fig. 2, the pockets *a* are kept closed by the action of the closing flap, and it forms a safeguard against the accidental loss of a portion or the whole of their contents. A pocket-book constructed according to this invention can be made cheaply; it is very convenient in its use, and it is more durable than a pocket-book of the ordinary construction or provided with a fastening such as now in use.

The principal advantage of the spring fastening is, that the same is not liable to get out of order, whereas the strings, clasps, India-rubber bands, or other devices heretofore used, are getting out of order at short intervals, causing much trouble; and when a pocket-book with an ordinary fastening is opened, the contents of the pockets, which remain in the hands of the owner while he takes a bill out of the bill-pouch, are liable to drop out and get lost, whereas by the new fastening said pockets are kept closed, and the accidental loss of their contents is avoided. It is obvious that this fastening is applicable to memorandum-books, diaries, and other articles of a similar nature, as well as to porte-monnaies.

What I claim as new, and desire to secure by Letters Patent, is—

A pocket-book or other similar article, provided with one or more strips *d* of steel, or other elastic material, in the edge or edges of its closing flap *c*, substantially as and for the purpose described.

J. F. DUBBER.

Witnesses:
W. HAUPT,
RUDOLF WEISTE.